United States Patent Office 3,484,376
Patented Dec. 16, 1969

3,484,376
METHODS OF MANUFACTURING METALLIC OXIDES AND IN PARTICULAR MIXED METALLIC OXIDES AND THEIR SOLID SOLUTIONS
Jacques Maurice Pâris, Jean-Claude Merlin, and René Antoine Pâris, all of 1 Rue Raulin, Lyon 7, Rhone, France
No Drawing. Continuation-in-part of application 282,515, May 22, 1963. This application May 2, 1966, Ser. No. 546,609
Claims priority, application France, May 23, 1962, 898,516, 898,517
Int. Cl. C04b 35/64, 35/12; H01f 1/02
U.S. Cl. 252—62.3         6 Claims

ABSTRACT OF THE DISCLOSURE

A method for preparing mixed oxides is disclosed. Said method involves the pyrolysis of a water soluble complex oxalate at temperatures between 200 and 550° C.

---

This application is a continuation-in-part of application Ser. No. 282,515 filed on May 22, 1963.

The present invention relates to methods of manufacturing metallic oxides, in particular mixed metallic oxides and their solid solutions.

It should be understood that the term "mixed metallic oxide" designates a homogeneous phase having a generally well defined crystalline structure wherein the metal ions and the oxygen ions are organized into a compact network according to the requirements of the neutralization of the charges of the cations and of the anions, Furthermore, in the following description and claims the term "solid solution of metallic oxides" designates a crystalline homegeneous phase into the composition of which enter, in variable proportions, two or several metallic oxides, either simple or mixed, which metallic oxides have a common atomic network.

The mixed metallic oxides according to the present invention may be represented by the following formulas $$GMO_2$$
$$GM_5O_8$$
$$J(MO_2)_2$$

wherein:

G is a monovalent metal chosen in the group consisting of Li and Na
J is a bivalent metal chosen in the group consisting of Mg, Be, Mn and Co
M is a trivalent metal chosen among the group consisting of Al, Ga, Cr, V, Fe and In.

The invention is also concerned with solid solutions into the composition of which enter, in various proportins, the following bodies:

(a) Either two or more than two simple metallic oxides having as formula $$M_2O_3$$

which gives binary solid solutions $M_2O_3$—$M'_2O_3$, ternary solid solutions $M_2O_3$—$M'_2O_3$—$M''_2O_3$, quaternary solutions $M_2O_3$—$M'_2O_3$—$M''_2O_3$—$M'''_2O_3$ or solid solutions of still higher order, M, M', M" . . . being chosen from the group of the trivalent metals above cited for the definition of M;

(b) Either two or more than two mixed metallic oxides having as formula $$GMO_2$$

which gives binary solid solutions belonging to the systems $GMO_2$—$G'MO_2$, $GMO_2$—$GM'O_2$, $GMO_2$—$G'M'O_2$, G' and M' being chosen from the groups of metals above cited to define G and M, ternary, quarternary or still higher order solid solutions being also to be taken into consideration, (c) Either two or more than two mixed metallic oxides having as formula $$J(MO_2)_2$$

which gives binary solid solutions belonging to the systems $J(MO_2)_2$—$J(M'O_2)_2$, $J(MO_2)_2$—$J'(MO_2)_2$, $$(MO_2)_2-J'(M'O_2)_2$$

J' and M' being chosen from the groups of metals above cited to define J and M, ternary, quarternary and still higher order solid solutions being also to be considered, and (d) Finally one or several simple metallic oxides and one or several mixed metallic oxides, both being of the spinel type, which gives binary solid solutions, in particular $M_3O_4$—$MM'_2O_4$ wherein M exists not only in the trivalent state but also in the bivalent state.

The invention is also concerned with a method of direct manufacture of said mixed metallic oxides and of said solid solutions without intermediate formation of simple oxides in the case where, the product being in the amorphous form, it is necessary to proceed to a subsequent heating in order to cause the crystalline structure of the mixed oxide to appear, said method consisting in subjecting to a pyrolysis at a temperature higher than 200° C., and preferably lower than 550° C., in an inert atmosphere (for instance of argon or nitrogen) or in an oxidizing atmosphere (for instance of oxygen or air) or in a reducing atmosphere (for instance of hydrogen) or in an oxidizing and reducing atmosphere (hydrogen and water vapor in various proportions), as the case may be, crystallized oxalic complex compounds to wit:

(A) Complex compounds soluble in water represented by the general formula (1) $\quad X_m J_{m-3}[M_x M'_y \ldots (C_2O_4)_3]_{m-2} n H_2O$ X being chosen among H and $NH_4$,
J being chosen among Mg or Mn,
M, M' . . . being chosen among Al, Ga, In, Cr, V, Fe, Co, Mn,
m being an integer equal to 3 or 4, and when $y=0$ $m=4$
n being a number ranging from 1 to 10, and
$x+y+ \ldots =1$ (1a) $\quad (NH_4)_4 J[M_x M'_y \ldots (C_2O_4)_3]_2$ which is a particular case of (1);

(2) $\quad (NH_4)_2 G[M_x M'_y \ldots (C_2O_4)_3] n H_2O$

G being chosen among Li and Na,
M, M' being chosen among Al, Ga, Cr, In, V, Fe, Co and Mn,
n being a number ranging from 1 to 10, and
$x+y+ \ldots =1$.

(3) $\quad T_m[M_x M'_y \ldots (C_2O_4)_3] n H_2O$

T being chosen among H, $NH_4$, Li and Na,
the other letters having the same signification as above stated, and
$x+y+ \ldots =1$ with two at least of the $x, y \ldots$ being different from zero;

(4) $\quad X_{2p} Mg[VO(C_2O_4)_2]_{p+1}$ p ranging from 0 to 1 and $XG[VO(C_2O_4)_2]$ (B) Complex combinations obtained by syncrystallization of at least two complex compounds as above stated, in particular according to Formulas 1 and 3 (syncrystallization being the phenomenon according to which two chemical individual bodies may concur in variable proportions and in a continuous manner in the construction of a common crystalline structure of homogeneous appearance).

Said complex combinations containing in all cases, in their crystalline structure, on the one hand the metals in the proportion corresponding exactly to the composition of the designated mixed oxide or solid solution and, on the other hand, radicals volatile or decomposed during the above mentioned pyrolysis and which may supply oxygen to the pyrolysis residue with the exclusion of any other atom, choice of the atmosphere in which pyrolysis is performed making it possible to obtain, in some cases, from the same oxalic complex compound, different mixed oxides or different solid solutions according as the metal M is in said mixed oxide or in said solid solution at the degree of oxidation 3 or 2.

Said process may also include a supplementary general treatment which consists in heating the pyrolysis residues to higher temperatures, preferably ranging from 800° C. to 1200° C. in an inert or oxidizing atmosphere, according as the case may be, and during times chosen in accordance with the degree of crystallization, with the fineness of the grain and therefore with the specific area which is to be given to the desired final product.

Concerning the above mentioned complex combinations which, in the method according to the present invention, are subjected to pyrolysis, they are obtained by means of crystals either anhydrous or hydrated, from their solutions.

The mixed oxides or the solid solutions obtained by pyrolysis of said complex combinations have a large specific area and are in the form of very fine grains the main dimension of which is lower than one micron.

The invention is more particularly concerned with methods of applying the above mentioned mixed oxides and solid solutions in particular as catalytic masses or catalyst supports (in particular as oxidizing, hydrogenizing, dehydrogenizing, dehydrating, dehydrocyclizing, aromatization, polymerizing catalysts), as semi-conductors, as ferroelectric, or ferromagnetic substances or again as special ceramics.

The following examples, which are not limitative and are given merely as of indicative character, are intended to illustrate the invention.

In a first group of examples we will give a number of mixed oxides according to the invention and the method of making each of them according to the invention.

EXAMPLE I

In order to prepare the anhydrous alkaline aluminates $NaAlO_2$ or $LiAlO_2$, we first prepare the complex salt corresponding to the formula $$Na(NH_4)_2[Al(C_2O_4)_3]3H_2O$$

or $$Li(NH_4)_2[Al(C_2O_4)_3]3H_2O$$

(which illustrates the general Formula 2) by causing aluminum powder to react with an aqueous solution containing oxalic acid, ammonium oxalate and sodium or lithium oxalate, the respective proportions of aluminum powder and of the other reagents complying with the following equation (in the case of the sodium complex):

$$2Al + 3H_2C_2O_4 + Na_2C_2O_4 + 2(NH_4)_2C_2O_4 \rightarrow 2Na(NH_4)_2[Al(C_2O_4)_3] + 3H_2$$

the equation being analogous for the lithium complex.

By evaporation of said solution we obtain crystals of the complex salt according to one of the two formulas above stated.

We decompose the crystals thus obtained by subjecting them to pyrolysis at a temperature ranging from 200° C. to 550° C. in an oxidizing atmosphere of air, which leads to a little organized residue of anhydrous aluminate of lithium or sodium, according as the case may be, in the form of fine grains the average dimension of which is smaller than one micron.

A heating at 800° C. for about two hours has for its result to increase the dimension of the grains and to improve the crystalline organization.

EXAMPLE II

In order to prepare the alkaline chromites $NaCrO_2$ and $LiCrO_2$ we first prepare the corresponding complex salts, of formula $$Na(NH_4)_2[Cr(C_2O_4)_3]3H_2O$$

or $$Li(NH_4)_2[Cr(C_2O_4)_3]3H_2O$$

(which illustrate the above mentioned general Formula 2), by causing ammonium bichromate to react, in aqueous solution, at ordinary temperature, on a mixture of oxalic acid, ammonium oxalate and lithium or sodium oxalate, the proportions of respective components of the reaction complying with the following equation (in the case of the sodium compound):

$$(NH_4)_2Cr_2O_7 + 7H_2C_2O_4 + (NH_4)_2C_2O_4 + Na_2C_2O_4 \rightarrow 2Na(NH_4)_2[Cr(C_2O_4)_3] + 6CO_2 + 7H_2O$$

the equation being analogous for the lithium complex compound.

By evaporation of said solution we obtain crystals of the complex salt according to one of the two above indicated formulas.

We decompose these crystals by subjecting them to pyrolysis at a temperature ranging from 200° C. to 550° C. in a reducing atmosphere consisting for instance of hydrogen, which leads to the obtainment of a sodium or lithium chromite residue, this residue, of little organized structure, being in the form of very fine grains the average dimension of which is smaller than one micron.

We increase the dimension of the grains and we improve the crystalline organization of said residue by heating at a temperature close to 800° C. for about ten hours.

EXAMPLE III

In order to prepare alkaline vanadite $NaVO_2$ or $LiVO_2$, we first prepare the corresponding dioxalic complex salt, of formula $$NaNH_4[VO(C_2O_4)_2]2H_2O$$

or $$LiNH_4[VO(C_2O_4)_2]2H_2O$$

(which illustrate the second of the two general Formulas 4 above stated) by causing ammonium metavanadate to react, in aqueous solution, at ordinary temperature, upon a mixture of oxalic acid and lithium or sodium oxalate, the proportions of the various components of the reaction complying with the following equation $$2NH_4VO_3 + 4H_2C_2O_4 + Na_2C_2O_4 \rightarrow 2NaNH_4[VO(C_2O_4)_2] + 2CO_2 + 4H_2O$$

this equation corresponding to the case of sodium but being analogous in the case of lithium.

By evaporation of said solution, we obtain crystals of the complex salt corresponding to one of the two above stated formulas.

We decompose the crystals thus obtained by pyrolysis at a temperature ranging from 200° C. to 550° C., in a reducing atmosphere consisting for instance of hydrogen, which leads to a residue of lithium or sodium vanadite, little organized, which is in the form of very fine grains the average dimension of which is lower than one micron.

We increase the dimensions of the grains and we improve the crystalline organization of said residue by heating at a temperature close to 800° C. for about ten hours.

EXAMPLE IV

In order to prepare the magnesium chromite $MgCr_2O_4$ we first prepare the corresponding oxalato-chromic complex compound of the following formula $$Mg[Cr(H_2O)_2(C_2O_4)_2]_27H_2O$$

by reducing chromic anhydride by oxalic acid in the presence of magnesia, the proportions of the various components of the reaction complying with the following equation $$2CrO_3 + 7H_2C_2O_4 + MgO \rightarrow$$
$$Mg[(H_2O)_2Cr(C_2O_4)_2]_2 + 6CO_2 + 3H_2O$$

By evaporation of the solution of violet red color thus formed we obtain lilac rose crystals of said oxalato-chromite complex compound. These crystals are very soluble in water but stable in air. Said crystals are decomposed by pyrolysis at a temperature ranging from 200° C. to 550° C. in a reducing atmosphere, consisting for instance of hydrogen, which leads to an amorphous black residue, which is in the form of very fine grains, the average dimension of which is smaller than one micron and the composition of which corresponds to magnesium chromite $MgCr_2O_4$.

We increase the dimensions of the grains and we improve the crystalline organization of said residue by heating at a temperature close to 800° C. for about four hours in an inert atmosphere consisting for instance of argon or nitrogen.

EXAMPLE V

In order to prepare a magnesium vanadite, we first prepare the corresponding oxalic complex compound the formula of which is $$(NH_4)_2[MgVO(C_2O_4)_2]_2$$

(which illustrates the first of the general Formulas 4 above mentioned) by causing ammonium metavanadate, oxalic acid and magnesia to react together in an aqueous medium and at ordinary temperature, the proportions of the various components of the reaction complying with the following equation $$2NH_4VO_3 + 5H_2C_2O_4 + MgO \rightarrow$$
$$(NH_4)_2Mg[VO(C_2O_4)_2]_2 + 2CO_2 + 5H_2O$$

We thus obtain a clear blue solution which, after evaporation in a vacuum at ordinary temperature, produces a deposit of a dark blue solid, very soluble in water and stable in air.

The component thus obtained is decomposed by pyrolysis at a temperature ranging from 200° C. to 550° C. in a reducing atmosphere, consisting for instance of hydrogen, which leads to an amorphous black residue oxidizable in air, the composition of which is that of magnesium vanadite.

By heating at a temperature higher than 800° C. we cause crystallization of said residue and the formation of the spinel structure $MgV_2O_4$.

EXAMPLE VI

In order to prepare an anhydrous magnesium ferrite $MgFe_2O_4$ we first prepare a complex salt of the following formula $$H_4Mg[Fe(C_2O_4)_3]_2 nH_2O$$

(which illustrates the general Formula 1 above referred to) by treating ferric hydroxide with oxalic acid so as to obtain a solution in which magnesia is dissolved, the proportions of the components of the reaction being such that they comply with the following chemical equation $$2Fe(OH)_3 + 6H_2C_2O_4 + MgO \rightarrow Mg[Fe(C_2O_4)_3]_2 + 7H_2O$$

By evaporation of said solution we obtain crystals of the complex salt according to the above formula.

Decomposition of these crystals, by pyrolysis at a temperature ranging from 200° C. to 550° C. in an oxidizing atmosphere consisting of air, leads to a magnesium ferrite $MgFe_2O_4$ in the form of very fine grains, the average dimension of which is smaller than one micron.

EXAMPLE VII

In order to prepare anhydrous cobalt aluminate we first prepare a complex salt of the following formula $$(NH_4)_3[Co_{1/3}Al_{2/3}(C_2O_4)_3] nH_2O$$

(which illustrates the above mentioned general Formula 3) by causing syncrystallization by evaporation of solutions of trivalent cobalt trioxalic complex compounds on the one hand and of aluminum on the other hand, the proportions according to which these solutions are mixed together being such that the respective amounts of cobalt and aluminum comply with said formula.

The crystals of the complex salt thus obtained are decomposed by pyrolysis at a temperature ranging from 200° C. to 550° C. in an oxidizing atmosphere consisting for instance of air, which leads to said anhydrous cobalt aluminate $CoAl_2O_4$, which is in the form of fine grains the average dimension of which is smaller than one micron.

EXAMPLE VIII

In order to prepare the mixed oxides $LiFe_5O_8$ we first prepare the complex salt of the following formula $$Li(NH_4)_{14}[Fe(C_2O_4)_3]_5 nH_2O$$

by syncrystallization of solutions of the trioxalic complex compounds of the following formulas $$Li_3[Fe(C_2O_4)_3]$$

and $$(NH_4)_3[Fe(C_2O_4)_3]$$

the relative proportions of said two complex compounds being such that the corresponding amounts of lithium and of iron comply with the formula of the above mentioned complex salt, the crystals thus obtained being decomposed by pyrolysis at a temperature ranging from 200° C. to 550° C. in an oxidizing atmosphere consisting of air, which leads to the formation of the mixed oxide $LiFe_5O_8$, in the form of very fine grains the average dimension of which is smaller than one micron.

EXAMPLE IX

In order to prepare the mixed spinel $CoAlCrO_4$ we first prepare the complex salt of the following formula III
$$(NH_4)_3[\overset{III}{Co}_{1/3}Cr_{1/3}Al_{1/3}(C_2O_4)_3] nH_2O$$

(which illustrates the above mentioned general Formula 3) by performing syncrystallization by evaporation of the solutions of the trioxalic complex compounds of chromium, of trivalent cobalt and of aluminum, said solutions being mixed in proportions such that the respective amounts of cobalt, chromium and aluminum present in the mixture thus obtained comply with the formula of said complex salt.

Said crystals are decomposed by pyrolysis at a temperature ranging from 200° C. to 550° C. in an oxidizing atmosphere consisting of air, which leads to said mixed spinel $CoAlCrO_4$ present in the amorphous state. After a subsequent heating at 700° C. the rays of the mixed spinel appear on the X-rays diagram. The mixed spinel is obtained in the form of very fine grains, the average dimension of which is smaller than one micron.

In a second group of examples, we will indicate a number of solid solutions according to the invention and the method of manufacturing each of them.

EXAMPLE X

In order to prepare binary solid solutions of the simple metallic oxides $Cr_2O_3$ and $Al_2O_3$ we first prepare the mixed trioxalic complex compounds of the following formula $$(NH_3)_4[Al_xCr_{1-x}(C_2O_4)_3] 3H_2O$$

(which illustrates the above mentioned general Formula 3) by producing syncrystallization of the simple complex compounds $$(NH_4)_3[Cr(C_2O_4)_3] 3H_2O$$

and $$(NH_4)_3[Al(C_2O_4)_3] 3H_2O$$

which are isomorphous.

We may vary, in the mixed complex compound, the value of $x$ from 0 to 1 by correspondingly chosing the respective proportions of said two simple complex compounds, whereby it is possible to obtain solid solutions $Cr_2O_3$-$Al_2O_3$ within the whole range of possible compositions.

Said mixed complex crystals, obtained either by cooling or by evaporation, are decomposed by pyrolysis at a temperature ranging from 200° C. to 550° C. in an inert or reducing (hydrogen, nitrogen or argon) atmosphere, which leads to an amorphous residue. Crystallization of the solid solution $Cr_2O_3$-$Al_2O_3$ is obtained by heating to a temperature higher than 800° C.

EXAMPLE XI

In order to prepare the binary solid solutions of the simple metallic oxides $Cr_2O_3$ and $V_2O_3$, we first prepare the mixed trioxalic complex compounds of the following formula $$(NH_4)_3[Cr_xV_{1-x}(C_2O_4)_3]3H_2O$$

(which illustrates the above mentioned general Formula 3) by producing syncrystallization in an inert atmosphere of the trioxalic simple complex compounds of chromium and vanadium which are isomorphous and the formulas of which are $$(NH_4)_3[Cr(C_2O_4)_3]3H_2O$$

and $$(NH_4)_3[V(C_2O_4)_3]3H_2O$$

By choosing the respective proportions of said two simple complex compounds, it is possible to vary, in the mixed complex compounds, the value of $x$ from 0 to 1, whereby we obtain the solid solutions of oxides $Cr_2O_3$-$V_2O_3$ within the whole range of possible compositions. In order to avoid oxidation of the trivalent vanadium, said operations should be conducted in an inert atmosphere consisting, for instance, of argon or nitrogen.

The above indicated mixed trioxalic complex compound is decomposed at a temperature ranging from 200° C. to 550° C., in a reducing atmosphere, consisting for instance of hydrogen, which leads to the amorphous solid solution $Cr_2O_3$-$V_2O_3$, crystallization of which is obtained by subsequent heating, in an inert or reducing atmosphere, at a temperature above 550° C., this crystallization being the better as the solution contains a higher amount of $Cr_2O_3$.

EXAMPLE XII

In order to prepare ternary solid solution of the simple metallic oxides $Cr_2O_3$, $V_2O_3$ and $Al_2O_3$, we first prepare the mixed trioxalic complex compounds of the following formula $$(NH_4)_3[Cr_xV_yAl_z(C_2O_4)_3]3H_2O$$

(which illustrates the above mentioned general Formula 3).

In the example hereinafter stated, we indicate the operations to be performed to obtain the mixed complex compounds with equiatomic proportions of the three metals, but, in order to obtain different relative proportions of these metals, it suffices to mix the solutions of the individual complex compounds in proportions that are correspondingly calculated.

We first prepare an aqueous solution of the trioxalic complex compounds of aluminum and vanadium by causing aluminum powder to react upon a solution consisting of ammonium metavanadate, oxalic acid and ammonium oxalate, the proportions of the respective components of the reaction being such that they comply with the following equation $$NH_4VO_3 + 4H_2C_2O_4 + \tfrac{5}{2}(NH_4)_2C_2O_4 + Al \longrightarrow$$
$$(NH_4)_3[Al(C_2O_4)_3] + (NH_4)_3[V(C_2O_4)_3] + H_2 + 3H_2O + CO_2$$

We further prepare a solution of chromium trioxalic complex compound by causing potassium bichromate to react upon a solution containing oxalic acid and ammonium oxalate, the components of this reaction being in respective proportions complying with the following equation.

$$(NH_4)_2Cr_2O_7 + 7H_2C_2O_4 + 2(NH_4)_2C_2O_4 \rightarrow$$
$$2(NH_4)_3[Cr(C_2O_4)_3] + 6CO_2 + 7H_2O$$

We then mix together the two solutions thus obtained in proportions such that the respective amounts of chromium vanadium and aluminum are equal.

Evaporation in a vacuum of the solution thus obtained leads to the mixed trioxalic complex compound, the formula of which is $$(NH_4)_3[Cr_{1/3}V_{1/3}Al_{1/3}(C_2O_4)_3]3H_2O$$

which is in the form of crystals of dark green color, stable in air.

These crystals are decomposed at a temperature ranging from 200° C. to 550° C. in a reducing atmosphere consisting for instance of hydrogen, which leads to an amorphous ternary solid solution capable of oxidizing in air. A subsequent heating effected in an inert atmosphere at a temperature higher than 550° C. produces crystallization of said solid solution; for instance a heating at 1000° C., for a time of ten hours in an argon atmosphere gives a product in the form of crystals which are still very fine. The X-ray diagram of this product shows large rays.

EXAMPLE XIII

In order to prepare the binary solid solutions of the mixed oxides $LiAlO_2$ and $LiCrO_2$ we first prepare the mixed trioxalic complex compound of the following formula $$(NH_4)_2Li[Al_xCr_{1-x}(C_2O_4)_3]3H_2O$$

(which illustrates the general Formula 2) by producing syncrystallization in air of the simple complex compounds of the following formulas $$(NH_4)_2Li[Al(C_2O_4)_3]3H_2O$$

and $$(NH_4)_2Li[Cr(C_2O_4)_3]3H_2O$$

which are isomorphous.

By choosing the ratios of the amounts of these two simple complex compounds, it is possible to vary, in the mixed complex compound, the value of $x$ from 0 to 1 so as to obtain solid solutions of the mixed oxides $$LiAlO_2\text{-}LiCrO_2$$

within the whole range of possible solutions.

Said mixed complex compound is decomposed by pyrolysis at a temperature ranging from 200° C. to 550° C. in a reducing or inert atmosphere (hydrogen, nitrogen or argon).

The pyrolysis residue crystallizes by heating at a temperature ranging from 600° C. to 1000° C. in an inert atmosphere consisting for instance of argon or nitrogen.

EXAMPLE XIV

In order to prepare binary solutions of the mixed oxides $MgAl_2O_4$ and $MgCr_2O_4$, we first prepare mixed complex compounds of the following formula $$H_4Mg[Al_vCr_{1-v}(C_2O_4)_3]_2nH_2O$$

with $n$ ranging from 10 to 15, by causing to react together the acid trioxalate of aluminum and ammonium, the acid trioxalate of ammonium and chromium and also magnesia, the respective components of the reaction being placed in the presence of one another in proportions determined according to the ratio of chromium to aluminum that is to be obtained. For instance, in the case of the mixed compound containing the same number of atoms of aluminum and chromium, the reagents are mixed together in properties complying with the following equation $$H_3[Al(C_2O_4)_3] + H_3[Cr(C_2O_4)_3] + MgO \rightarrow$$
$$H_4Mg[Al_{1/2}Cr_{1/2}(C_2O_4)_3]_2 + H_2O$$

Evaporation in a vacuum, at ordinary temperature, of the mixed complex compound leads to hygroscopic crystals of lilac rose color.

Said crystals of the mixed compound are decomposed by pyrolysis at a temperature ranging from 200° C. to 550° C. in an inert atmosphere (for instance of argon or nitrogen) or in a reducing atmosphere (for instance of hydrogen) which leads to the above mentioned binary solution, which is in the form of an amorphous black residue, crystallization of which is obtained by heating at a temperature of about 1000° which gives very fine crystals corresponding to the mixed spinel $MgAl_2O_4$-$MgCr_2O_4$.

EXAMPLE XV

In order to prepare a solid solution of the two following spinels: $Co_3O_4$ and $CoCr_2O_4$, we first prepare a complex salt of the following formula

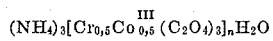

(which illustrate the above mentioned main Formula 3) by producing syncrystallization by evaporation of the solutions of trivalent chromium and cobalt trioxalic complex compounds mixed together in respective proportions determined in accordance with the ratio to be obtained of the amount of chromium to the amount of cobalt.

The complex salt thus obtained is then decomposed by pyrolysis at a temperature ranging from 200° C. to 550° C. in an oxidizing atmosphere consisting of air, which produces said solid solution of the two spinels $Co_3O_4$ and $CoCr_2O_4$, said solid solution being in the form of very fine grains, the average dimension of which are below one micron.

We thus obtain mixed metal oxides and solid solutions of simple metal oxides or of mixed metal oxides which, owing to their particular properties, to wit their anhydrous state, their reactivity, their specific surface and their amorphous or crystallized state, have many advantages with respect to known mixed metal oxides and solid solutions.

In a general manner, while we have, in the above description, disclosed what we deem to be practical and efficient embodiments of the invention, it should be well understood that we do not wish to be limited thereto as there might be changes made therein without departing from the principle of the present invention as comprehended within the scope of the appended claims.

What we claim is:

1. A method for preparing mixed oxides and solid solutions of oxides of determined metals, which comprises, in a first step, forming an aqueous solution consisting of one of the water soluble complex oxalates having the following formulae:

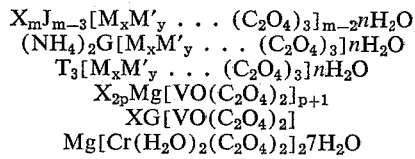

wherein X is a member of the group consisting of H and $NH_4$, J is a member of the group consisting of Mg, Be and Mn, G is a member of the group consisting of Li and Na, T is a member of the group consisting of Li and Na, M, M', . . . are members of the group consisting of Al, Ga, In, Cr, V, Fe, Co and Mn, $n$ is a number ranging from 1 to 10, the sum $x+y$ . . . is equal to 1, $m$ is an integer equal to 3 or 4 when $x$ is different from 1 and equal to 4 when $x$ equals 1, $p$ ranges from 0 to 1, and concentrating said solution to produce crystallization of said one complex oxalate, in a second step, subjecting said one complex oxalate to pyrolysis, at a temperature higher than 200° C. and lower than 550° C. and in an atmosphere of gases selected from the group consisting of hydrogen, carbon monoxide, methane, nitrogen, rare gases, water vapor, mixtures thereof, oxygen, mixtures of oxygen with the gases selected from the group consisting of nitrogen, rare gases, water vapor, and mixtures thereof, thereby obtaining mixed metallic oxides and solid solutions of metallic oxides wherein the ratios between their respective contents in metallic atoms are the same than in said one water soluble complex oxalate.

2. A method according to claim 1 wherein the forming of said complex oxalates, in said first step, comprises forming an aqueous solution of at least two of the corresponding monometallic oxalates and concentrating said aqueous solution to recover crystals of said complex oxalates.

3. A method according to claim 1 which further comprises, in a third step, subjecting the mixed metallic oxides and their solid solutions, obtained in the form of submicronic particles to a higher temperature in a nonreducing atmosphere, thereby controlling the size and the specific area of the crystals in the final product.

4. A method according to claim 3 wherein, in said third step, said mixed metallic oxides and their solid solutions, obtained in the form of submicronic particles, are heated to temperature ranging from 800° C. to 1200° C., in a nonreducing atmosphere.

5. A method for preparing mixed oxides and solid solutions of oxides of determined metals, which comprises, in a first step, forming an aqueous solution consisting of one of the water soluble complex oxalates having the following formulae:

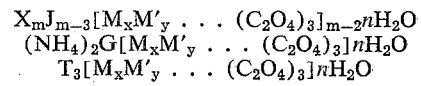

wherein X is a member of the group consisting of H and $NH_4$, J is a member of the group consisting of Mg, Be and Mn, G is a member of the group consisting of Li and Na, T is a member of the group consisting of Li and Na, M, M', . . . are members of the group consisting of Al, Ga, In, Cr, V, Fe, Co and Mn, $n$ is a number ranging from 1 to 10, the sum $x+y$ . . . is equal to 1, $m$ is an integer equal to 3 or 4 when $x$ is different from 1 and equal to 4 when $x$ equals 1, and concentrating said solution to produce crystallization of said one complex oxalate, and, in a second step, subjecting said one complex oxalate to pyrolysis, at a temperature higher than 200° C. and lower than 550° C. and in an atmosphere of gases selected from the group consisting of hydrogen, carbon monoxide, methane, nitrogen, rare gases, water vapor, mixtures thereof, oxygen, mixtures of oxygen with the gases selected from the group consisting of nitrogen, rare gases, water vapor, and mixtures thereof, thereby obtaining mixed metallic oxides and solid solutions of metallic oxides wherein the ratios between their respective contents in metallic atoms are the same than in said one water soluble complex oxalate.

6. A method according to claim 5 which comprises, in said first step, forming an aqueous solution of at least two isomorphous complex oxalates having the same general formulae and concentrating said aqueous solution by evaporation to recover crystals of said complex oxalates.

References Cited

FOREIGN PATENTS 644,639 10/1950 Great Britain.
799,436 8/1958 Great Britain.
853,784 11/1960 Great Britain.

TOBIAS E. LEVOW, Primary Examiner

J. COOPER, Assistant Examiner

U.S. Cl. X.R.

23—50, 51, 52, 56, 58; 106—39; 252—62.56, 62.57, 62.58, 62.6, 62.61, 62.62, 62.64, 62.9